No. 707,386. Patented Aug. 19, 1902.
J. R. CARTER.
COUPLING FOR PITMEN.
(Application filed Apr. 19, 1902.)
(No Model.) 3 Sheets—Sheet 1.
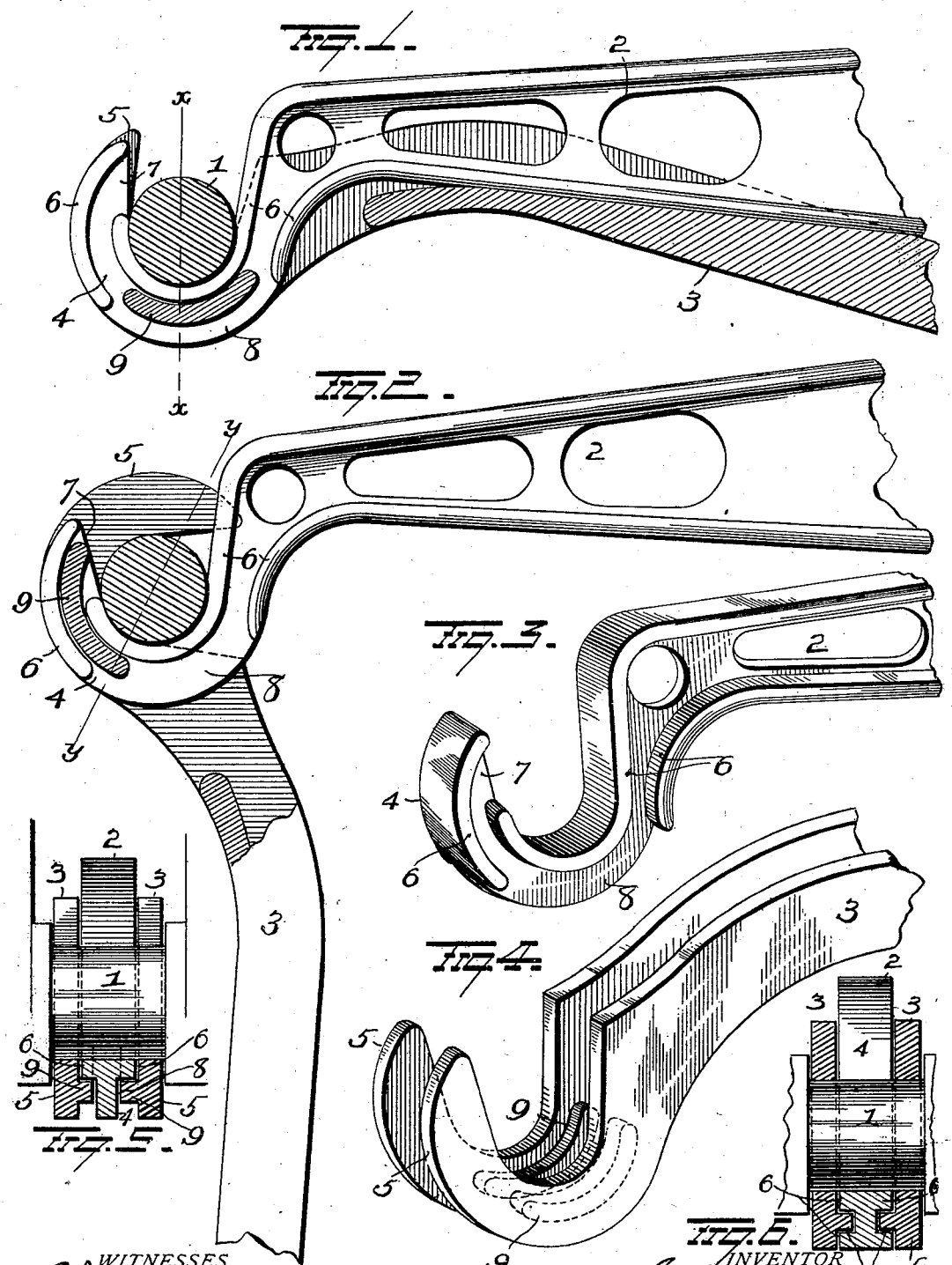
WITNESSES
INVENTOR
J. R. Carter
By H. A. Seymour
Attorney

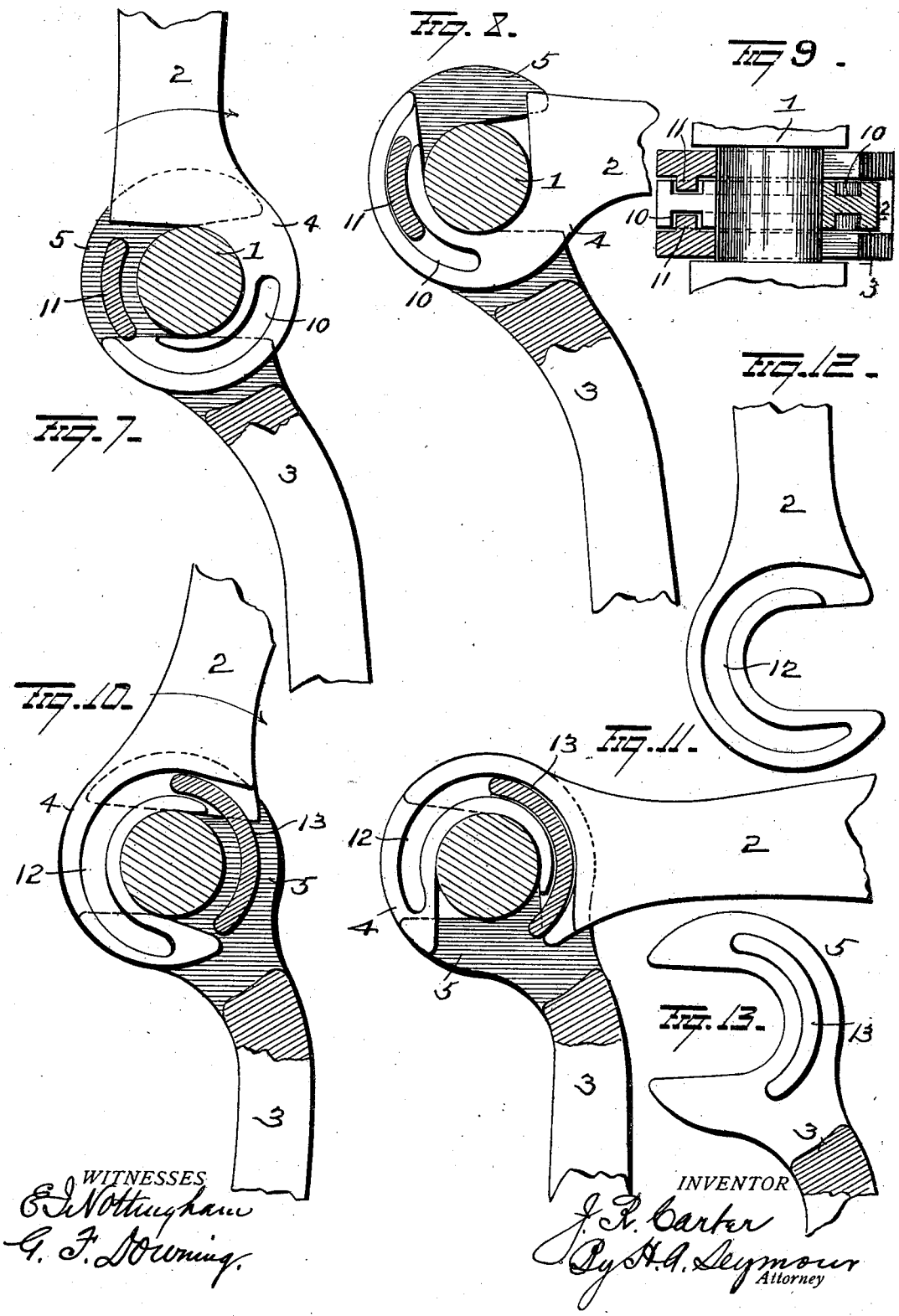

No. 707,386. Patented Aug. 19, 1902.
J. R. CARTER.
COUPLING FOR PITMEN.
(Application filed Apr. 19, 1902.)
(No Model.) 3 Sheets—Sheet 3.
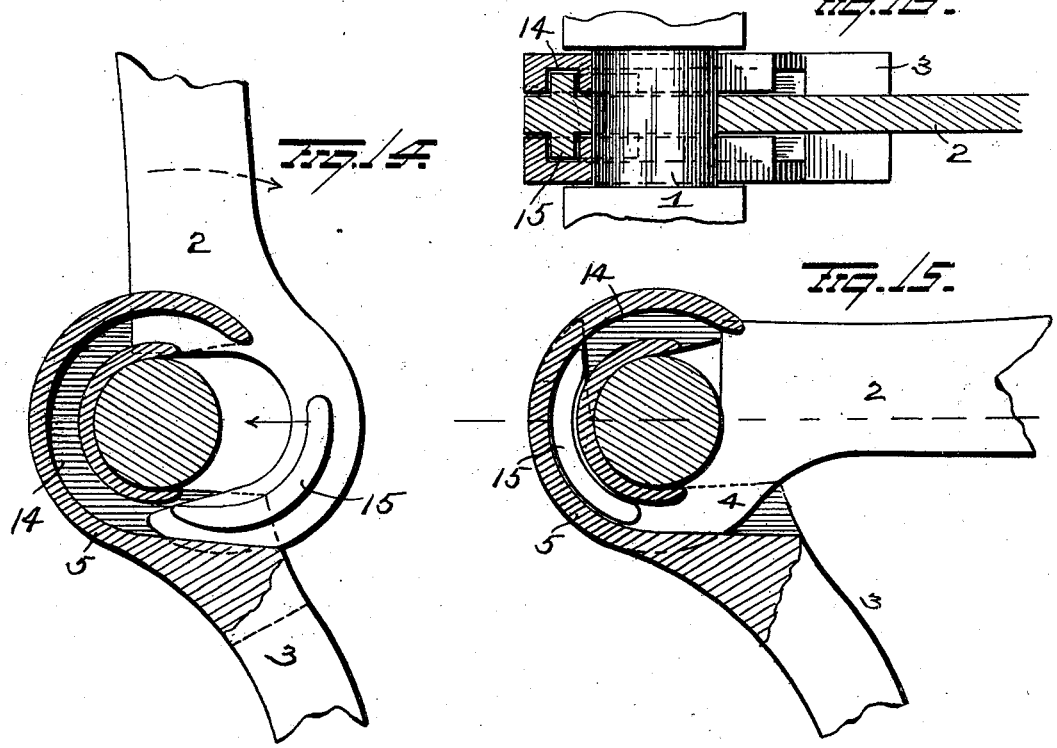
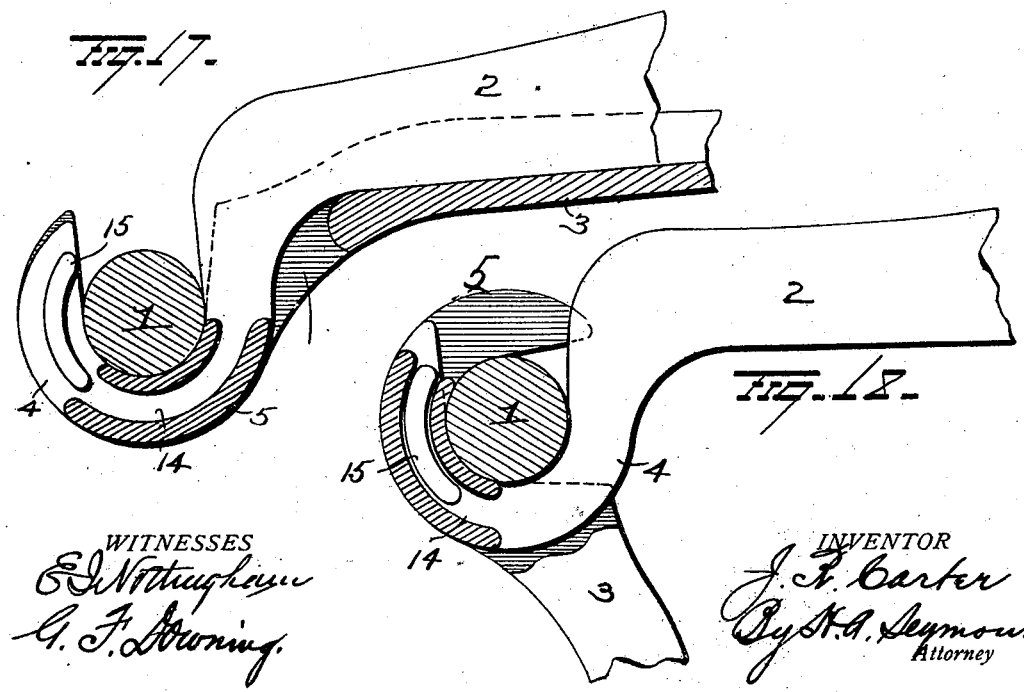
WITNESSES
INVENTOR
Attorney

UNITED STATES PATENT OFFICE.

JOHN R. CARTER, OF AUGUSTA, KENTUCKY, ASSIGNOR TO ERNST H. HUENEFELD, OF CINCINNATI, OHIO.

COUPLING FOR PITMEN.

SPECIFICATION forming part of Letters Patent No. 707,386, dated August 19, 1902.

Application filed April 19, 1902. Serial No. 103,815. (No model.)

*To all whom it may concern:*

Be it known that I, JOHN R. CARTER, of Augusta, in the county of Bracken and State of Kentucky, have invented certain new and useful Improvements in Couplings for Pitmen; and I do hereby declare the following to be a full, clear, and exact description of the invention, such as will enable others skilled in the art to which it appertains to make and use the same.

My invention relates to an improved coupling, and more particularly to a coupling of improved construction for pitmen whereby they may be readily connected to and disconnected from a shaft, the primary object of the invention being to so construct pitmen for use on washing-machines and the like which will permit of the ready connection and disconnection of the crank-shaft and pitmen, which latter are employed to transmit motion to the respective rubbers to reciprocate them in opposite directions.

With this object in view the invention consists in certain novel features of construction and combinations and arrangements of parts, as will be more fully hereinafter described, and pointed out in the claims.

In the accompanying drawings, Figure 1 is a view, partially in section, illustrating the pitmen in position to receive the crank-shaft. Fig. 2 is a similar view showing the pitmen moved to a position to lock upon the shaft. Figs. 3 and 4 are perspective views of one end of the pitmen. Fig. 5 is a view in section on the line $xx$ of Fig. 1. Fig. 6 is a view in section on the line $y\,y$ of Fig. 2. Figs. 7, 8, and 9 are views illustrating one modified form of construction. Figs. 10, 11, 12, and 13 are views of another modified construction, and Figs. 14, 15, and 16 and Figs. 17 and 18 are views of still other modifications.

1 represents a crank-shaft, and 2 3 the pitmen to be connected therewith. The pitman 2 is made with a single hook 4 to be locked between double books 5 on pitman 3, as will now be explained.

Pitman 2 and hook 4 thereon are provided on both sides at each edge with flanges 6, conforming to the contour of the pitman and hook and forming a channel on each side of the hook, and the flange is cut away at the inner edge of the hook at its free end, forming an entrance 7, and at the base of the hook at both sides, forming an entrance 8. The double hooks 5 are each provided on their inner faces across the base thereof with segmental flanges 9 of approximately the length of entrances 8, so as to permit them to pass through the entrances 8 and support the hook 4 upon its upper flange when the hooks are alined for assembling, as shown in Fig. 1. In other words, the hook 4 is dropped down into the double hooks with all the hooks pointing upward to receive shaft 1, and when either of the pitmen are turned to throw the hooks out of alinement the segments 9 will be moved into the channels formed by flanges 6 and lock the hooks together and on the shaft against displacement, as shown in Fig. 2.

The length of segments 9 is of course immaterial, as lugs or a single lug might be employed in place of the segments, in which event the entrances 7 and 8 would be just large enough to permit the lug to enter the channels formed by flanges 6 of hook 4.

While the manner of assembling the hooks by alining them is preferable, still I can assemble them by placing the hooks in opposite positions and entering the segments 9 through the entrances 7, when a turn of the hooks will lock them, as will be readily understood.

Figs. 7, 8, and 9 are views illustrating a modified form of my invention, in which the single hook 4 is made on each side with a channel 10, extending from the free end of the hook to a point near the base thereof. In assembling this coupling the hooks are placed point to point with the pitmen projecting in opposite directions. The hook 4 is then inserted down over shaft 1 and between double hooks 5 until the segments 11 on the inner face of hooks 5 are in a position to enter the open end of channels 10, when by a partial turn of either pitman on the shaft the segment will be moved far enough into the channel to securely lock the hooks on the shaft and prevent their removal until moved to the position for assembling.

In Figs. 10, 11, 12, and 13 I have shown another modified form of my invention, in which the channels 12 in single hook 4 extend from a point near the free end of the hook around to the opposite end thereof, where the channel is open, as shown. This hook is locked between the double hooks by placing the double hooks on the shaft and then inserting the single hook down between them, as shown in Fig. 10, when a slight turn of either pitman will move segments 13 on the double hooks 5 into the channels 12 in hook 4 and lock the hooks together and on the shaft.

In all of the forms above described the channels are in the single hook and the segments or lugs on the double hooks. This is not essential, as the channels can be in the double hooks and the segments or lugs on the single hook, as shown in Figs. 14, 15, 16, 17, and 18.

The channels 14 in the inner faces of the double hooks 5 are made at each end with entrances for the segments or lugs 15 on the single hook 4, thus permitting the hooks to be assembled when alined, as shown in Fig. 17, or the hooks can be assembled by placing the hooks point to point and inserting the segments 15 into the ends of the channels 14, as shown in Fig. 14.

A great many other changes might be made in the general construction of the hooks to permit a lug or segment on the side of one hook to enter and lock in a channel in the other hook, and hence I do not wish to be limited to the precise constructions set forth, but consider myself at liberty to make such changes and alterations as fairly fall within the spirit and scope of my invention.

Having fully described my invention, what I claim as new, and desire to secure by Letters Patent, is—

1. The combination of two hooks to be locked on a shaft, and means on the side face of one hook between the outer and inner edges thereof to engage the adjacent side of the other hook and lock the hooks together.

2. The combination of two hooks to be locked on a shaft, a lug on the side face of one hook and the other hook channeled on one face to receive this lug and lock the hooks against removal from the shaft when turned out of their position for assembling.

3. The combination of two hooks to be locked on a shaft, a lug on the side face of one of the hooks and the other hook having a channel and an entrance to said channel for the lug to lock the hooks together when the lug is moved into the channel and away from the entrance.

4. The combination with a single hook and double hooks to be locked upon a shaft, the single hook having a channel on one side, of a lug on the inner face of one of the double hooks to enter the channel and lock the hooks together when either is turned.

5. The combination of double hooks and a single hook to be locked upon a shaft, there being channels in the side faces of the single hook having entrances to said channels at the base of the hook and lugs or segments on the inner faces of the double hooks at the base portions thereof to enter the channels in the single hook through said entrances and move into the channels when either hook is turned out of its position for assembling.

In testimony whereof I have signed this specification in the presence of two subscribing witnesses.

JOHN R. CARTER.

Witnesses:
S. W. FOSTER,
A. W. BRIGHT.